United States Patent [19]
Binard

[11] 4,066,202
[45] Jan. 3, 1978

[54] METHOD FOR MAKING TUBULAR WELDED WIRE SCREENS

[75] Inventor: Edouard Binard, Brussels, Belgium

[73] Assignee: N. V. Bekaert S. A., Zwevegem, Belgium

[21] Appl. No.: 732,546

[22] Filed: Oct. 14, 1976

[30] Foreign Application Priority Data

Feb. 10, 1976   Belgium ..................... 838396

[51] Int. Cl.² ............... B23K 31/02; B21F 15/08
[52] U.S. Cl. .................... 228/173 E; 228/178; 29/163.5 CW; 140/112
[58] Field of Search ................ 228/173 E, 178; 140/112; 219/56, 58; 29/163.5 CW

[56] References Cited

U.S. PATENT DOCUMENTS

| 3,753,797 | 8/1973 | Fukuda ............... 219/56 X |
| 3,908,256 | 9/1975 | Smith ............ 29/163.5 CW |
| 3,920,170 | 11/1975 | Colburn et al. ........ 219/56 X |

FOREIGN PATENT DOCUMENTS

889,670   1/1972   Canada ..................... 140/112

*Primary Examiner*—Donald G. Kelly
*Assistant Examiner*—K. J. Ramsey
*Attorney, Agent, or Firm*—Shlesinger, Arkwright, Garvey & Dinsmore

[57] ABSTRACT

A method for making cylindrical welded wire screens by continuously bending a wire into a helical wrap with juxtaposed equal wraps having their diameter substantially equal to the desired finished diameter of the screen whereby the radius of curvature applied to the wire is smaller than the radius of the wrap and the bending area is inside the outer circumference, supporting the wraps and progressively guiding them and bringing them into contact with supporting wires substantially parallel to the generatrix of the cylinder, and welding the wraps to the supporting wires at their contact points.

5 Claims, 3 Drawing Figures

METHOD FOR MAKING TUBULAR WELDED WIRE SCREENS

BACKGROUND AND OBJECTS

The present invention relates to a method for making a cylindrical screening device whereby filtration takes place through narrow slot openings formed between the successive windings of juxtaposed helically wrapped elements. It is generally known to make slot screens, in particular cylindrical slot screens, hereinafter called slot tubes, by welding a helically wound wire (forming the cylindrical screening surface and hereinafter called screening wire) in successive contact points to supporting wires longitudinally extending according to the generating line of the cylinder. The screening wire often is a profile wire having for example a triangular cross-section. In order to ensure strict tolerances on the size of the slot opening, it is of utmost importance that the heli formed by the screening wire have a perfectly cylindrical shape. It has already been proposed to pull the screening wire, which is fed to the welding station, between a set of unpowered bending rollers located close to the welding station in order to give the screening wire the desired curvature.

However, this method proved to be ineffective since the curved screening wire segment located between the welding station and the bending rollers excessively straightened so that the ultimately desired cylindrical curvature of the screening wire spiral was hard to control. As a remedy, it was then proposed to feed the aforementioned curved screening wire segment tensionless to the welding station by driving a set of bending rollers in a suitable manner and synchronizing the driving speed of the set of bending rollers to that of the forward motion of the screening wire through the welding device. This technical solution, however, has the disadvantage of requiring an additional synchronization device on each welding machine. Moreover, the bending device must always be located outside the circumference of the well screen so that, in the curved wire segment between the bending device and the welding station, forces are inevitably caused to exist, which counteract somewhat the applied curvature (greater curvature radius in said segment than that applied in the bending device).

The present invention now provides means to obviate the above mentioned disadvantages. Therefore the method according to the invention essentially comprises two process steps. In a first process step the screening wire is continuously bent between a set of bending rollers into a helical wrap with juxtaposed equal windings and with a diameter substantially equal to the desired ultimate diameter of the well screen. The radius of the curvature, which is being applied in the wire in this process, is essentially smaller than the diameter of the obtained helical wrap in order to allow for the elastic extension of the bent shape.

In a second process step, the preformed cylindrical helical wrap is fed to the welding station to be connected to the supporting wires, which extend according to the generating line of the cylinder, by means of a known welding method.

The preliminary bending of the wire into the cylindrical wire wrap with a predetermined diameter is a simple process that can be carried out on a bending device operating independently of the welding device, so that synchronization is not necessary. Bending may also be done much faster than welding so that one bending device may suffice for feeding several welding machines.

The separate bending of the screening wire also permits to carry out the bending operation in an area located inside the outer circumference of the windings. The curved wire leaving this bending area then extends to the desired screen diameter while forming the desire helical wrap.

The progressive guiding and bringing into contact of successive segments of the thus preformed helical wire in the welding device is also done without applying tension on the preformed spiral, as will be described further on.

DESCRIPTION OF THE DRAWINGS

The invention will now be further described with reference to the accompanying drawing in which.

DESCRIPTION OF THE INVENTION

Figure 1:
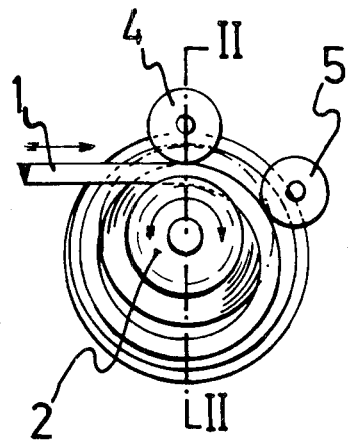
FIG. 1 is a schematic end view of a bending device according to the invention.
Figure 2:
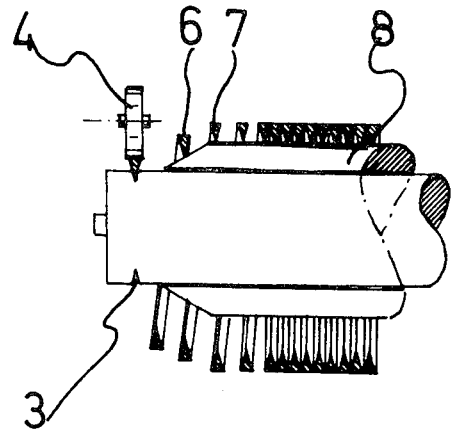
FIG. 2 is a cross-sectional view of the bending device.

The wire 1 to be bent and having for example a triangular cross-section is paid off by means of a bending device from a non-illustrated spool preferably via a passage through a non-illustrated wire straightener. The bending device essentially comprises a powered cylindrical mandrel 2 provided with a circumferential groove 3 in which the wire is seized and pressed by an unpowered pressure roller 4. The wire then runs in curved conditions under the adjustable bending roller 5. The adjustable distance from the roller 5 to the mandrel 2 determines the desired curvature. The wire extends in down-stream direction from the roller 5 until the desired diameter of the helical wrap is obtained. The formed wraps 6, 7 thus have a greater diameter than the applied curvature. Accordingly, as the wraps are formed, they slide upon the supporting cylinder 8. Their linear rotation speed is evidently equal to the peripheral velocity of the mandrel. However, since their diameter is bigger than twice the curvature radius applied by roller 5, the angular speed of the supporting cylinder 8 for the formed wraps 6, 7 . . . will be inferior to or less than that of the mandrel 2. Therefore, a non-illustrated transmission coupling is provided so that the angular speeds of the mandrel 2 and the cylinder 8 may be adapted to each other as a function of the formed helical diameter. The cylinder 8 and the mandrel 2 do not necessarily have a coaxial or common rotation axis.

Figure 3:
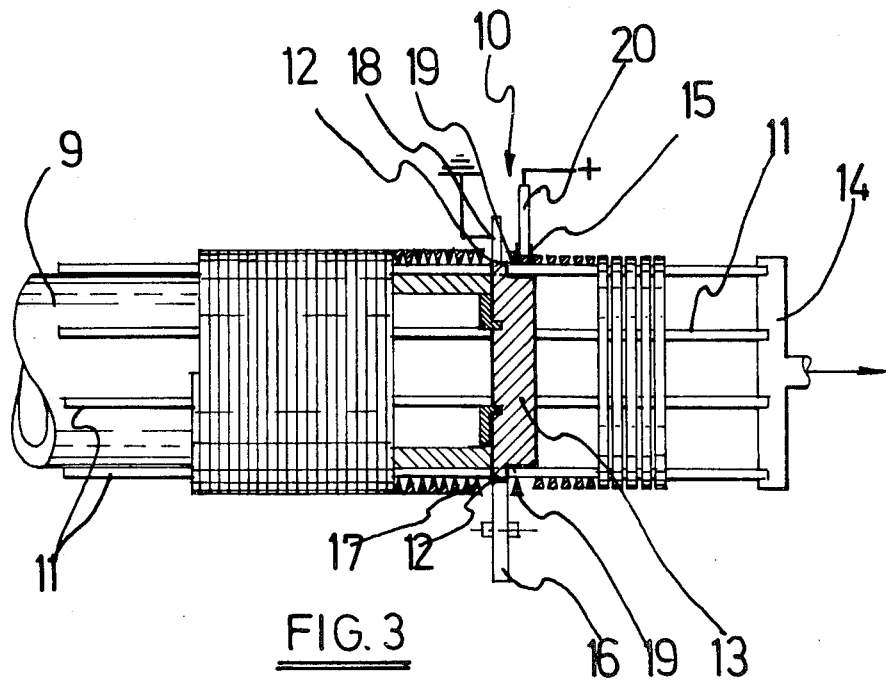
FIG. 3 is a detailed cross-sectional view of the welding device.

Next the spiral wrap thus formed is fed with its leading end to the welding device 10 (FIG. 3) on a supporting cylinder 9. Inside the wrap, the supporting cross wires 11 are axially disposed and fed through suitable openings 12 in a guiding disc 13 which can rotate around its axis and is located under the welding head. The speed of rotation of the disc 13 is adapted in a known manner by a suitable transmission coupling to the axial advancing speed of the cross wires 11 by means of the clamp head 14 in which the leading ends of the cross wires are seized. In this way the slot width between the successive welded wraps can be adjusted as desired. The spiral wrap 17 upstream from the disc 13 is guided progressively along the sliding contact 18 which serves as earthening or grounding pole for the welding circuit. The downstream adjacent wrap 19 is next passed through accurately adjusted guides 15 located right under the welding electrode 20 and welded on the cross wire. The electrode may for example be a roller electrode. The disc 13 is suitably supported in its rotating movement by, for example, rollers 16.

It is preferable to choose the inner diameter of the preformed spiral wrap substantially equal to the ultimate desired outer diameter of the slot tube.

During welding, the wires are partially pressed into each other on the crossing points so that the diameter of the wrap is slightly reduced. The method according to the invention is particularly suited for the manufacture of slot tubes with diameters smaller than 25 cm and wherever very narrow slot widths (inferior to 200 microns) are required. However it is not limited to this application.

While this invention has been described as having a preferred design, it will be understood that it is capable of further modification. This application is, therefore, intended to cover any variations, uses, or adaptations of the invention following the general principles thereof and including such departures from the present disclosure has come within known or customary practice in the art to which this invention pertains, and as may be applied to the essential features hereinbefore set forth and fall within the scope of this invention or the limits of the appended claims.

I claim:

1. A method for making cylindrical welded wire screens comprising:

a. continuously bending a wire into a helical wrap so as to form juxtaposed equal wraps substantially free of residual bending stresses, each of said wraps having a diameter substantially equal to the desired finish diameter of the cylindrical screen and whereby the radius of curvature imparted to the wire during the bending step is smaller than the radius of the formed wraps, said continuous bending being performed inside the outer circumference of the wraps, b. supporting said formed wraps and progressively guiding said formed wraps and bringing successive points of said formed wraps into contact with a plurality of supporting wires extending in the contact area substantially parallel to the generatrix of the cylindrical screen thereby substantially equally spacing successive connecting points of the wraps with the same supporting wire, and c. connecting successive contact points of said wraps with said supporting wires by welding.

2. A method as in claim 1 and wherein the inner diameter of the cylinder formed by the spiral wraps before welding is substantially equal to the outer diameter of the welded cylindrical screen.

3. Welded cylindrical screen produced according to the method of claim 1.

4. A screen as in claim 3 and wherein the outer diameter of the cylindrical screen is less than 25 cm.

5. A screen as in claim 4 wherein the space between adjacent wraps is less than 200 microns.

* * * * *